(12) United States Patent
Fujii et al.

(10) Patent No.: US 8,780,398 B2
(45) Date of Patent: Jul. 15, 2014

(54) MOBILE TERMINAL, OUTPUT CONTROL SYSTEM, AND DATA OUTPUTTING METHOD FOR THE MOBILE TERMINAL

(71) Applicants: Michiko Fujii, Tokyo (JP); Jun Murata, Tokyo (JP); Koji Suzuki, Kanagawa (JP); Takayuki Kunieda, Tokyo (JP); Keiya Shibata, Tokyo (JP)

(72) Inventors: Michiko Fujii, Tokyo (JP); Jun Murata, Tokyo (JP); Koji Suzuki, Kanagawa (JP); Takayuki Kunieda, Tokyo (JP); Keiya Shibata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/706,714

(22) Filed: Dec. 6, 2012

(65) Prior Publication Data
US 2013/0163039 A1 Jun. 27, 2013

(30) Foreign Application Priority Data
Dec. 6, 2011 (JP) ................. 2011-267099

(51) Int. Cl.
*G06F 15/00* (2006.01)
*G06F 3/12* (2006.01)
*G06K 1/00* (2006.01)

(52) U.S. Cl.
USPC .......................................... 358/1.15; 358/1.1

(58) Field of Classification Search
None
See application file for complete search history.

(56) References Cited

U.S. PATENT DOCUMENTS

| 2004/0203358 | A1* | 10/2004 | Anderson et al. | 455/41.1 |
| 2006/0044598 | A1* | 3/2006 | Etelapera | 358/1.15 |
| 2011/0285658 | A1 | 11/2011 | Homma et al. | |

FOREIGN PATENT DOCUMENTS

| JP | 2002-149616 | 5/2002 |
| JP | 2002-279210 | 9/2002 |
| JP | 2005-332118 | 12/2005 |
| JP | 2006-163794 | 6/2006 |
| JP | 2010-182046 | 8/2010 |

* cited by examiner

*Primary Examiner* — Douglas Tran
(74) *Attorney, Agent, or Firm* — Oblon, Spivak, McClelland, Maier & Neustadt, L.L.P.

(57) ABSTRACT

According to an embodiment, provided is a mobile terminal, that includes: an operation display unit that displays information and receives operation input; an operation detection unit that detects operation of the operation display unit; a motion detection unit that detects a motion of the mobile terminal; a data selection unit that selects data to be output; an output destination determining unit that determines an external apparatus serving as an output destination of the selected data; and an output instruction unit that gives an instruction of outputting the data to the external apparatus when the motion is detected by the motion detection unit.

15 Claims, 7 Drawing Sheets

MOBILE TERMINAL
HOME SCREEN

START EXISTING PROGRAM

FIG.2B

MOBILE TERMINAL
EXISTING PROGRAM'S
SCREEN

FIG.2C

MOBILE TERMINAL
PRINT INSTRUCTION
SCREEN

FIG.2D

MOBILE TERMINAL
PRINTER SETTING
SCREEN

IP ADDRESS DESIGNATION PICKER

SELECT BUTTON

MOBILE TERMINAL, OUTPUT CONTROL SYSTEM, AND DATA OUTPUTTING METHOD FOR THE MOBILE TERMINAL

CROSS-REFERENCE TO RELATED APPLICATIONS

The present application claims priority to and incorporates by reference the entire contents of Japanese Patent Application No. 2011-267099 filed in Japan on Dec. 6, 2011.

BACKGROUND OF THE INVENTION

1. Field of the Invention

The present invention relates to a mobile terminal that controls an external apparatus such as an image forming apparatus or a projector by intuitive operation, an output control system, and a data outputting method for the mobile terminal.

2. Description of the Related Art

The popularization of mobile terminals such as smartphones and personal digital assistants (PDAs) enable highly functional operations such as creation of documents, browsing of word wide web (Web) pages, and editing of images to be also performed through using the mobile terminals. As a result, functions to output data thus created or browsed to external apparatuses such as image forming apparatuses and projectors are also built in the mobile terminals. An example of such mobile terminals has a communication function using a communication system such as a wireless local area network (wireless LAN) or Bluetooth (registered trademark), and the mobile terminals are connected to a network using the communication function.

As for an operation method, in the mobile terminal such as a smartphone, for giving an instruction of output to an external apparatus, a printing processing system described in Japanese Patent Application Laid-open No. 2006-163794 is known, for example. In the printing processing system, a technique is disclosed in which a thumbnail image is produced by an image forming apparatus and the image forming apparatus sends the image to a mobile terminal; and a print instruction is output after a user confirms the image to be printed. In the operation of the print instruction, an operation screen is displayed on a display serving as a user interface of the mobile terminal and the instruction is transmitted by an input that is input through the operation screen.

As another operation method in the mobile terminal such as the smartphone, a method is disclosed in Japanese Patent Application Laid-open No. 2002-149616 in which information in a mobile terminal can be searched or browsed by detecting motions such as "tilting" or "shaking" the mobile terminal as a more intuitive method besides the operation of the operation screen on the display.

In the above-described operation method of output instruction, however, the operations need to be performed, while visually confirming menus or icons displayed on the operation screen. The operation based on motions such as "tilting" or "shaking" too, is limited to being used for browsing or searching of information in the mobile terminal.

There is a need to provide a mobile terminal that enables an instruction of outputting data to be intuitively given.

SUMMARY OF THE INVENTION

It is an object of the present invention to at least partially solve the problems in the conventional technology.

According to an embodiment, provided is a mobile terminal that includes: an operation display unit that displays information and receives operation input; an operation detection unit that detects operation of the operation display unit; a motion detection unit that detects a motion of the mobile terminal; a data selection unit that selects data to be output; an output destination determining unit that determines an external apparatus serving as an output destination of the selected data; and an output instruction unit that gives an instruction of outputting the data to the external apparatus when the motion is detected by the motion detection unit.

According to another embodiment, provided is an output control system that includes: a mobile terminal; and an external apparatus. The mobile terminal includes: an operation display unit that displays information and receives operation input; an operation detection unit that detects operation of the operation display unit; a motion detection unit that detects a motion of the mobile terminal; a data selection unit that selects data to be output; an output destination determining unit that determines an external apparatus serving as an output destination of the selected data; and an output instruction unit that gives an instruction of outputting the data to the external apparatus when the motion is detected by the motion detection unit. The external apparatus includes: an output unit that outputs instructed data.

According to still another embodiment, provided is a data outputting method for a mobile terminal. The data outputting method includes: displaying information and receiving operation input by an operation display unit; detecting operation of the operation display unit by an operation detection unit; detecting a motion of the mobile terminal by a motion detection unit; selecting data to be output by a data selection unit; determining an external apparatus serving as an output destination of the selected data by an output destination determining unit; and giving an instruction of outputting the data to the external apparatus when the motion is detected by the motion detection unit by an output instruction unit.

The above and other objects, features, advantages and technical and industrial significance of this invention will be better understood by reading the following detailed description of presently preferred embodiments of the invention, when considered in connection with the accompanying drawings.

DETAILED DESCRIPTION

Embodiments of a system that controls output from a mobile terminal to an external apparatus are described in detail below with reference to the accompanying drawings.

First Embodiment

Figure 1:
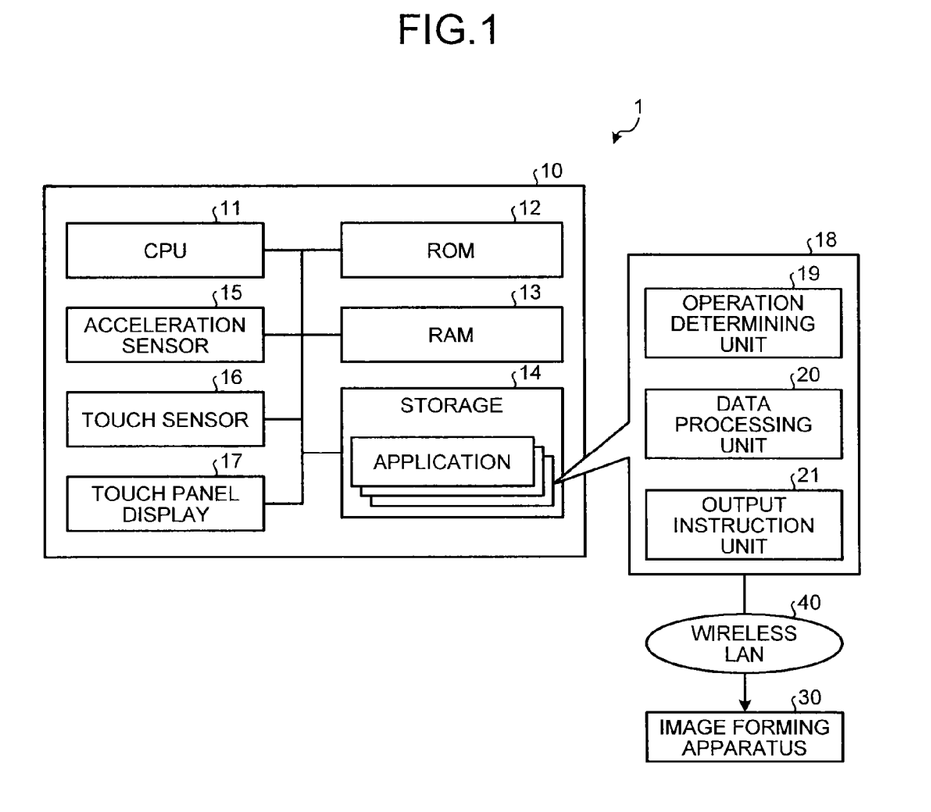
FIG. 1 is a block diagram illustrating an exemplary structure of an output control system according to a first embodiment.

FIG. 1 is a block diagram illustrating a structure of a system that controls output from a mobile terminal according to a first embodiment to an external apparatus. As illustrated in FIG. 1, an output control system 1 has a structure in which a mobile terminal 10 such as a smartphone or a personal digital assistant (PDA) and an image forming apparatus 30 serving as an external apparatus are coupled through a wireless local area network (wireless LAN) 40.

The mobile terminal 10 includes a CPU 11, a ROM 12, a RAM 13, a storage 14, an acceleration sensor 15, a touch sensor 16, a touch panel display 17, and an output controller 18.

The CPU 11 controls the whole of the mobile terminal 10 and has various chip sets through which the CPU 11 is coupled to other apparatuses. The ROM 12 is a read only memory used for a storage memory of programs and data. The RAM 13 is a writable and readable memory used for a development memory of programs and data and a drawing memory of a printer, for example.

The storage 14 stores therein image data, programs, font data, and forms, for example. Various applications are also stored in the storage 14. The storage 14 can be structured by generally used various recording media such as a hard disk drive (HDD), an optical disk, a memory card, and a random access memory (RAM).

The acceleration sensor 15 corresponds to a motion detection unit that detects motions of the mobile terminal 10. The acceleration sensor 15, which constantly acquires parameters at constant time intervals, acquires an X value, a Y value, and a Z value on the respective three X, Y, and Z axes.

In addition, the acceleration sensor 15 acquires values of $\Delta X$, $\Delta Y$, and $\Delta Z$ which are changing rates per unit time of the X value, the Y value, and the Z value, respectively; and tX, tY, and tZ which are respective time intervals when the X value, the Y value, and the Z value change. The acceleration sensor 15 can detect the motions applied to the mobile terminal such as the motions of "shaking" and "tilting" the mobile terminal.

The touch sensor 16 corresponds to an operation detection unit that detects the operation to the touch panel display 17. The touch sensor 16 acquires parameters when detecting a touch made on the touch panel display 17 or at an operation timing designated by a relevant program. The parameters to be acquired include a touch event, coordinates (Vx,Vy) of a position at which a touch is made on the touch panel display 17, the number of positions at which touches are made, changing amounts of the position coordinates ($\Delta Vx, \Delta Vy$), and changing amounts per unit time of the position coordinates (tVx,tVy).

The touch panel display 17, which can display data and to which a user can perform input operation, corresponds to an operation display unit.

The output controller 18 provides to a user a function capable of controlling output to the external apparatus by intuitive motions such as "shaking" and "tilting" motions, and is stored in the storage 14 in the same manner as the other applications. The output controller 18 includes an operation determining unit 19, a data processing unit 20, and an output instruction unit 21.

The operation determining unit 19 determines or calculates which motion or operation is performed on the basis of values acquired by the acceleration sensor 15 and the touch sensor 16. Specifically, the operation determining unit 19 uses the parameters acquired from the acceleration sensor 15 for determining or calculating the following items.

X value, Y value, and Z value on the respective X axis, Y axis, and Z axis: the posture of the mobile terminal 10.

Gravity acceleration $\Delta X$, $\Delta Y$, and $\Delta Z$ on the respective X axis, Y axis, and Z axis: whether the posture of the mobile terminal 10 is changed, and whether the motion of "shaking" or "tilting" is applied to the mobile terminal 10.

Time intervals tX, tY, and tZ: the number of times the mobile terminal 10 is "shaken".

The operation determining unit 19 uses the parameters acquired from the touch sensor 16 for determining the following items.

Touch event: whether a motion of making a touch on the touch panel display 17 is performed, whether a motion of removing from the touch panel display 17 is performed, whether the touch made on the touch panel display 17 continues, or whether no touch is continuously made on the touch panel display 17.

Position coordinates (Vx,Vy): the position at which a touch is made on the touch panel display 17, or which data or button on the touch panel display 17 is selected.

The number of positions at which touches are made: the number of fingers simultaneously making a touch on the touch panel display 17 or the number of operation devices such as styluses.

Changing amounts of position coordinates ($\Delta Vx, \Delta Vy$): a moving distance of a finger sliding over the touch panel display 17.

Changing amounts per unit time of position coordinates (tVx,tVy): a speed of a finger moving over the touch panel display 17.

The operation determining unit 19 determines that the "shaking" motion is continuously performed when the same motion pattern of the mobile terminal 10 is detected at least two times. That is, the operation determining unit 19 can differentiate between motions of shaking the mobile terminal 10 one time and of shaking the mobile terminal 10 continuously at least two times.

The operation determining unit 19 determines the motion as the "shaking" motion when the absolute values of the gravity accelerations $\Delta X$, $\Delta Y$, and $\Delta Z$ are equal to or more than certain thresholds. In addition, the operation determining unit 19 determines that a motion is a continuous motion when the time intervals tX, tY, and tZ between the motions detected two times are within a certain period of time, i.e., Tmax seconds. In this regard, there is a case when the gravity acceleration is reduced at a moment and thereafter exceeds the threshold again during the motion of shaking the mobile terminal 10 one time. To prevent the determination that the mobile terminal 10 is continuously shaken in such a case, the motion is not determined as the "shaking" motion performed continuously two times when time elapsing under a condition where the gravity acceleration is equal to or less than the threshold is equal to or less than Tmin. That is, when Tmax≥tX, tY, tZ≥Tmin, and the absolute values of ΔX, ΔY, and ΔZ are equal to or more than certain thresholds, the operation determining unit 19 determines that the shaking motion is continuously performed.

The data processing unit 20 acquires the content of processing allocated to the motion pattern determined by the operation determining unit 19 and processes data. The processing contents allocated to the respective motion patterns are stored in the storage 14. For example, an instruction of outputting data to the image forming apparatus 30 is allocated to the motion of "shaking" the mobile terminal 10 as the processing content. When the "shaking" motion is performed, the data processing unit 20 produces image data for printing and sends the instruction to the output instruction unit 21.

The data processing unit 20 determines partial data to be displayed on the touch panel display 17 out of data in cooperation with an application, and causes the touch panel display 17 to display a thumbnail image serving as the partial data in a thumbnail display area 54 (illustrated in FIGS. 2A to 2D). The thumbnail image can be switched to another thumbnail image serving as another partial data by operation of sliding a finger or a stylus over the touch panel display 17 transversely or longitudinally. That is, processing of switching thumbnail images is allocated to the motion of sliding the thumbnail image of the touch panel display 17 by a finger.

Figure 2A:
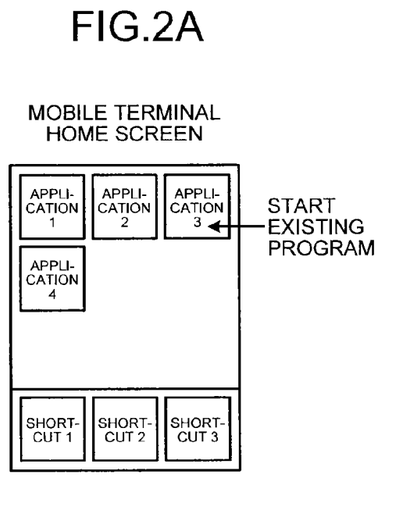
FIGS. 2A to 2D are schematic diagrams illustrating an exemplary transition of an operation screen of a mobile terminal in the first embodiment.
Figure 2B:
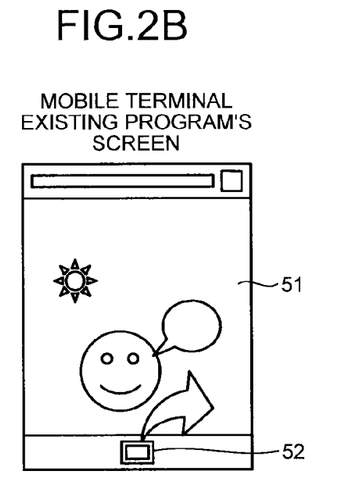
Figure 2C:
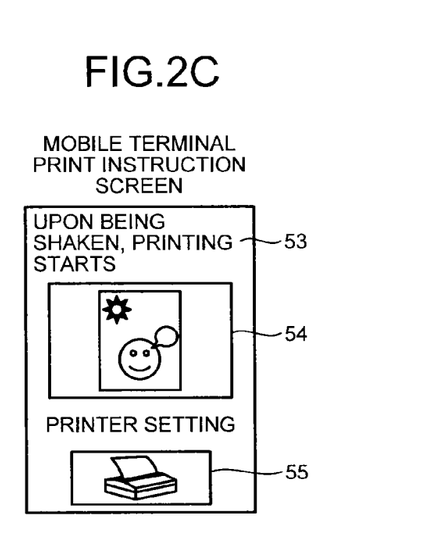

FIGS. 2A to 2D are schematic diagrams illustrating a transition of an operation screen of the mobile terminal 10 when the output controller is used. FIG. 2A illustrates an initial screen of the mobile terminal 10, in which the respective applications stored in the storage 14 are displayed on the touch panel display 17. When one of the applications is selected, the selected application starts and the screen of the selected application is displayed as illustrated in FIG. 2B. In the application, selected data 51 such as selected document files and image data is displayed on the touch panel display 17. When a cooperation button 52 that starts cooperation with the output controller 18 is operated while the data is selected, the operation screen of the output controller 18 is displayed as illustrated in FIG. 2C. Meanwhile, the selected data 51 is transmitted to the output controller 18 and the output controller 18 stores the selected data 51 in the storage 14.

The operation screen of the output controller 18 includes a message section 53, the thumbnail display area 54, and a printer setting section 55. This screen structure is an example. For another example, a button for setting printing conditions may be included in the screen.

The message section 53 displays messages for a user. In this example, the message of "upon being shaken, printing starts" is displayed. The message, however, can be changed. For example, a message of "please select a printer" can be displayed when no image forming apparatus serving as the output destination is selected.

The thumbnail display area 54 displays thumbnail images of the selected data 51. When the selected data 51 is composed of a plurality of pages, the thumbnail display area 54 displays one of the pages, i.e., a thumbnail image is served as partial data. When the selected data 51 is composed of a plurality of pages, the thumbnail image is switched to another thumbnail image of the other page by the operation of sliding the thumbnail display area 54 with a finger. That is, the data processing unit 20 achieves a function of a display area selection unit by switching the thumbnail images in accordance with the operation of the thumbnail display area 54.

Figure 2D:
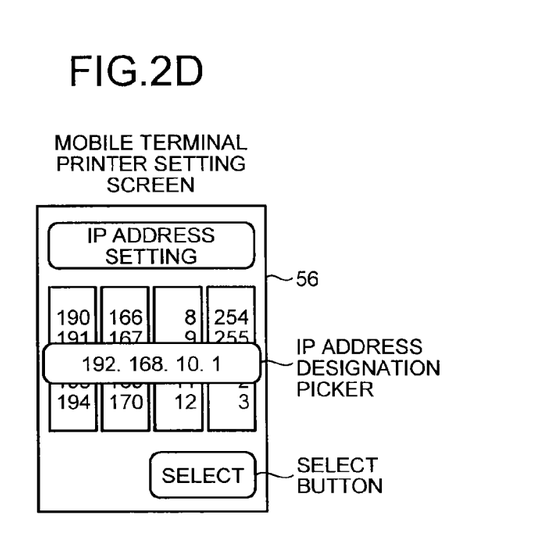

The printer setting section 55 displays an operation screen for determining the image forming apparatus 30 serving as the output destination by being operated. FIG. 2D illustrates an example of the printer setting section 55 for determining the image forming apparatus 30, which is a printer. In the printer setting screen, the image forming apparatus 30 serving as the output destination is determined by operating an Internet protocol (IP) address designation picker 56 and by directly designating the IP address of the image forming apparatus 30. That is, the data processing unit 20 achieves a function of an output destination determining unit by determining the image forming apparatus 30 through the printer setting section 55. Meanwhile, the image forming apparatus 30 determined as the output destination is stored in the storage 14.

Figure 3:
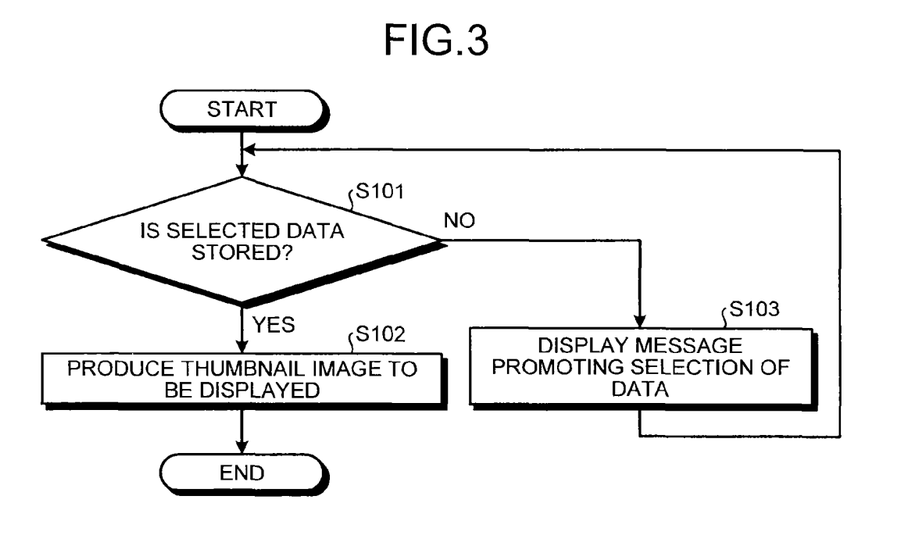
FIG. 3 is a flowchart illustrating a flow of processing relating to a display of a thumbnail image in the mobile terminal in the first embodiment.

FIG. 3 is a flowchart illustrating a flow of processing relating to the operation of the thumbnail image. The processing starts when the cooperation button 52 is operated, or the application corresponding to the output controller 18 is operated through a home screen of the mobile terminal 10. As illustrated in FIG. 3, the data processing unit 20 determines whether the selected data 51 is stored in the storage 14 serving as a memory area (step S101). When the output controller 18 starts while a file is opened by an application, data is stored in the storage 14 at the time when the data is received by the output controller 18. Therefore, when the processing starts by the operation of the cooperation button 52, the selected data 51 used in the last processing is detected. On the other hand, when the output controller 18 starts directly, no selected data 51 is detected normally.

If the selected data 51 is present (Yes at step S101), the data processing unit 20 produces a thumbnail image to be displayed in the thumbnail display area 54 on the basis of the selected data 51 (step S102), and then ends the processing. On the other hand, if no selected data 51 is stored (No at step S101), the data processing unit 20 causes the message section 53 to display the message of "please select a file" (step S103).

Figure 4:
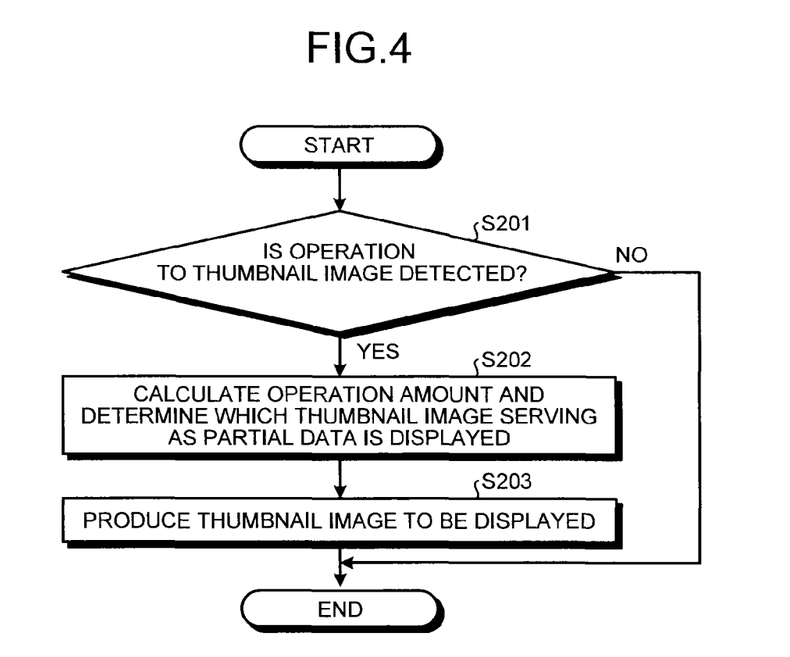
FIG. 4 is a flowchart illustrating a flow of processing relating to operation of the thumbnail image in the mobile terminal in the first embodiment.

An example of a flow of processing when operation is performed to the thumbnail display area 54 is described below with reference to FIG. 4. The processing starts, when the operation is performed while a thumbnail image is displayed in the thumbnail display area 54. The operation determining unit 19 determines whether operation is performed to the thumbnail image displayed in the thumbnail display area 54 (step S201). In the determination of the operation, the touch event, the position coordinates (Vx,Vy), the changing amounts of position coordinates (ΔVx, ΔVy), and the changing amounts per unit time (tVx,tVy) that are acquired by the touch sensor 16 are used.

If it is determined that the operation is performed to the thumbnail image (Yes at step S201), the data processing unit 20 acquires the operation amount, i.e., a moving amount and a speed of a finger sliding over the touch panel display 17, from the touch sensor 16, and determines which thumbnail image to display serving as partial data (step S202). Specifically, as the finger is moved faster by a larger stroke, more pages are moved and determined as a display region. On the other hand, if no operation is performed to the thumbnail image (No at step S201), the data processing unit 20 ends the processing.

The data processing unit 20 produces the thumbnail images of the determined pages serving as partial data and causes the thumbnail display area 54 to display them (step S203).

Figure 5:
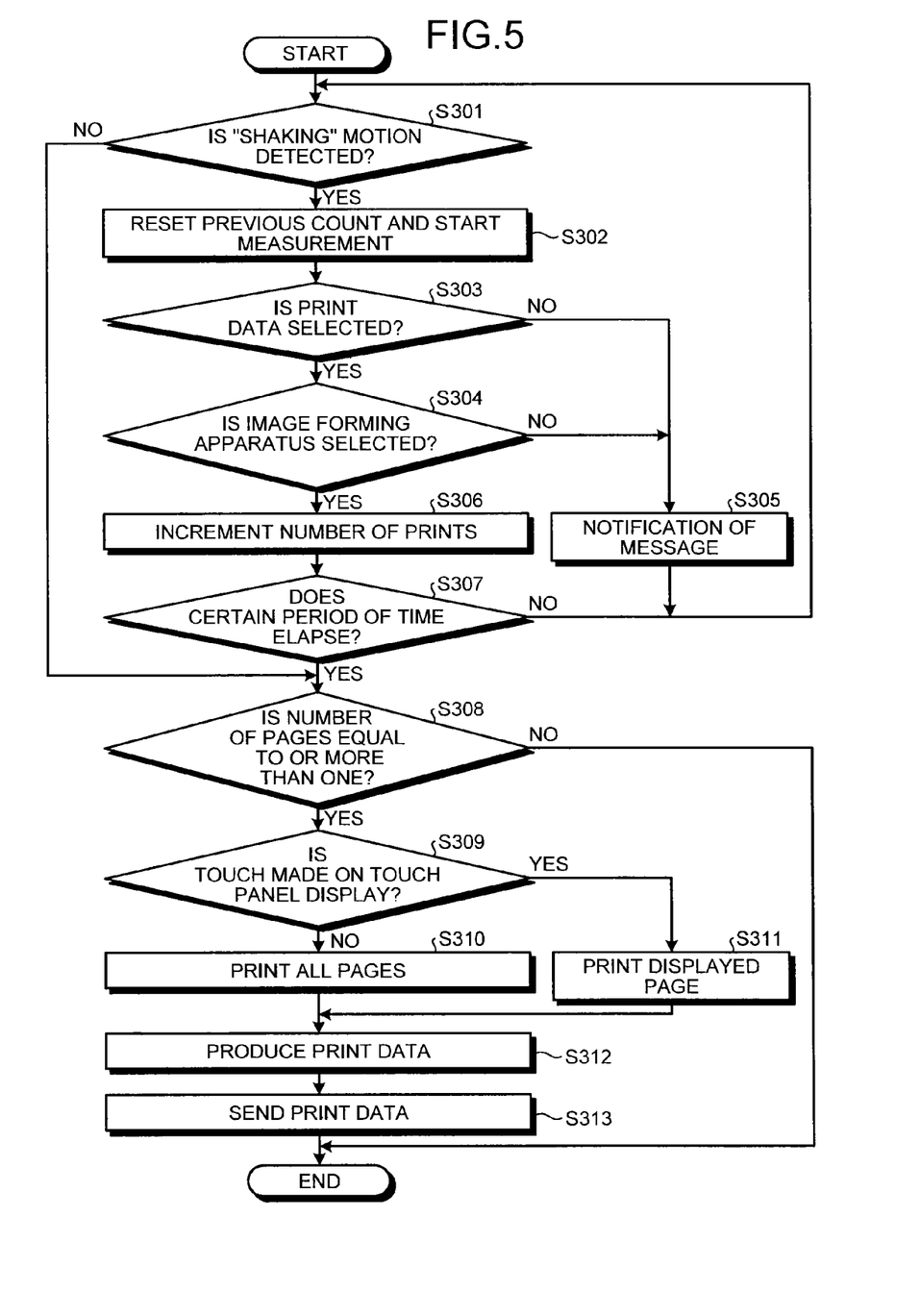
FIG. 5 is a flowchart illustrating a flow of processing relating to an output instruction in the mobile terminal in the first embodiment.

FIG. 5 is a flowchart illustrating a flow of processing when a motion of the mobile terminal is detected that indicates a print instruction. The processing in FIG. 5 starts every time the acceleration sensor 15 performs detection. The operation determining unit 19 determines whether the motion of "shaking" the mobile terminal 10 is performed on the basis of the parameters acquired from the acceleration sensor 15 (step S301). If the "shaking" motion is performed (Yes at step S301), the data processing unit 20 resets the time and starts measurement from "zero (0)" (step S302). The data processing unit 20 determines whether data to be printed is selected (step S303) and whether the image forming apparatus 30 serving as the output destination is determined (step S304). If the print data is selected and the image forming apparatus 30 serving as the output destination is determined (Yes at step S303 and step S304), the data processing unit 20 increments the number of prints (step S306). On the other hand, if no print data is selected or the image forming apparatus 30 serving as the output destination is not determined (No at step S303 or S304), the data processing unit 20 causes the message section 53 to display the corresponding message, e.g., "please select a printer" or "please select a file", and then, the processing returns to step S301 (step S305).

The data processing unit 20 determines whether time elapsing after starting of the measurement at step S302 exceeds a certain period of time (step S307). If the certain period of time elapses (Yes at step S307), the data processing unit 20 determines that the motion of "shaking" the mobile terminal 10 ends, and fixes the number of prints, and determines whether the number of pages to be printed is at least one (step S308). On the other hand, if the certain period of time does not elapse (No at step S307), the processing from step S301 to step S307 is repeated again. If the operation determining unit 19 determines that no "shaking" motion is performed on the basis of a value of the acceleration sensor 15 (No at step S301), the determinations at step S301 and step S307 are repeated until a certain period of time elapses. The data processing unit 20 increments the number of prints by one when the "shaking" motion is detected on the basis of the value of the acceleration sensor 15.

If the number of prints is at least one (Yes at step S308), the operation determining unit 19 determines whether a touch event over the touch panel display 17 is detected by the touch sensor 16 when the motion of "shaking" the mobile terminal 10 is performed (step S309). If the number of prints is not at least one (No at step S308), the processing ends without outputting the print instruction.

If no touch event is detected (No at step S309), the data processing unit 20 sets such a printing condition that all pages of the selected data 51 are printed (step S310). On the other hand, If a touch event is detected (Yes at step S309), the data processing unit 20 sets such a printing condition that only the page displayed in the thumbnail display area 54 out of the selected data 51 is printed (step S311).

The data processing unit 20 produces print data obtained by converting the selected data 51 into images (step S312) and sends the print data together with the printing condition such as the number of prints to the output instruction unit 21 (step S313).

As described above, the mobile terminal 10 enables a user to give instructions to the external output apparatus by the intuitive motion such as the motion of "shaking" the mobile terminal 10, thereby enabling user-friendliness to improve because the user can operate the mobile terminal 10 without viewing the display thereof.

In addition, the number of prints can be set by the number of times the mobile terminal 10 is shaken, thereby enabling a user to readily set the number of prints even though it is difficult for the user to set a detailed printing condition to the mobile terminal 10 because of the small operation screen.

Furthermore, a user can determine whether to print all pages or only one page on the basis of whether the user makes a touch on the touch panel display 17 while shaking the mobile terminal 10, thereby enabling the user to readily operate the setting of a printing range without viewing the operation screen.

The first embodiment can be changed as follows, for example. For example, when it is determined that the "shaking" motion is continuously performed, the number of pages allocated to one sheet is changed instead of changing the number of prints. Specifically, when the mobile terminal 10 is continuously shaken two times, printing may be performed by an allocation setting of "2 in 1". When the mobile terminal 10 is continuously shaken three times, printing may be performed by an allocation setting of "4 in 1". The processing contents allocated to the respective motion patterns may be properly changed to other contents. For example, various types of selection processing such as the presence or absence of duplex printing, switching between color and monochrome printing, the presence or absence of sorting, whether prints are stapled, whether final finishing is performed, and whether prints are folded may be preliminarily allocated to various motion patterns, and may be stored in the storage 14.

Figure 6:
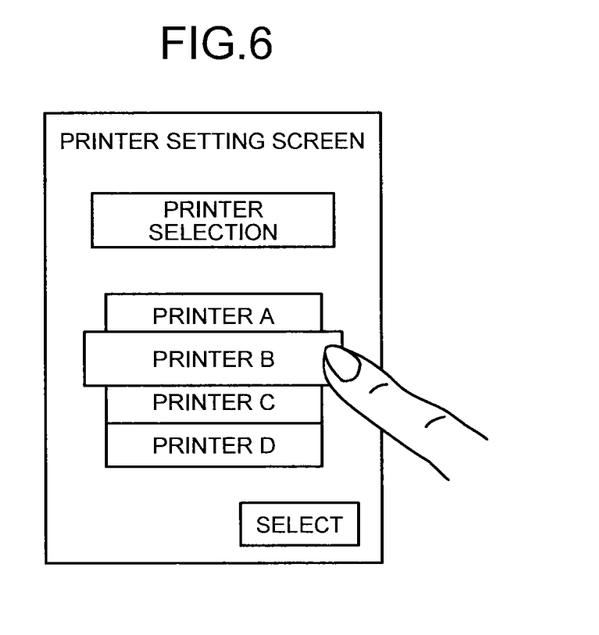
FIG. 6 is a schematic diagram illustrating another example of a printer setting screen of the mobile terminal in the first embodiment.

In the embodiment, the printer is determined on the basis of the IP address in the printer setting screen. The printer may be selected from a list of printers. As exemplarily illustrated in FIG. 6, a user may select a printer from a list of connectable printers, which list may be automatically acquired from the mobile terminal 10. Specifically, a list of printer drivers installed in the mobile terminal 10 may be acquired. Printers connected to the same network may be acquired without installing the printer drivers. Such methods enable highly user-friendly operation to be provided for a user because the user does not need to input the IP address.

When the mobile terminal 10 is shaken while a touch is made on the touch panel display 17, only the data displayed on the screen may be printed instead of printing only one page. This method is applied to a case when data is not divided for each page. For example, this is a case when a page written in the hyper text markup language (HTML) is displayed by a web browser.

All pages may be printed regardless of whether a touch is made on the touch panel display 17.

As for the measurement method of time elapsing from the detection of the motion of "shaking" the mobile terminal 10, the measurement continues from the first "shaking" motion without being reset, the number of times of the "shaking" motions detected until a certain period of time elapses is counted, and the number of prints can be set to the counted value, besides the method measuring a period of time from the detection of the "shaking" motion to the next detection of the "shaking" motion as in the above-mentioned embodiment.

As for the motions determined as the print instruction by the operation determining unit 19, motions enabling a user to operate the mobile terminal 10 without viewing the screen such as the motion of "tilting" can be employed besides the "shaking" motion. The shaking way can be properly changed in various ways such as shaking the mobile terminal 10 up and down and shaking the mobile terminal 10 right to left.

A value from a gyro sensor may be acquired in addition to the value from the acceleration sensor 15.

Other wireless lines such as Bluetooth (registered trademark) can be selected as the line coupling the mobile terminal 10 to the external apparatus besides the wireless LAN 40. Alternatively, the external apparatus wired through a gateway can be selected.

The change of an image to be displayed in the thumbnail display area 54 may be allocated to the motion of shaking the mobile terminal 10 from right to left instead of the operation to the touch panel display 17. The print instruction may be allocated to the motion of shaking the mobile terminal 10 up and down.

Second Embodiment

FIGS. 7 to 10 are schematic diagrams illustrating the operation screens of the mobile terminal 10 according to a second embodiment. In FIGS. 7 to 10, a projector is selected as the external apparatus. As described in the second embodiment, a projector or a storage can be selected as the external apparatus besides the image forming apparatus. Even for these apparatuses, the output instruction can also be given by intuitive motions such as the motion of "shaking" the mobile terminal 10.

Figure 7:
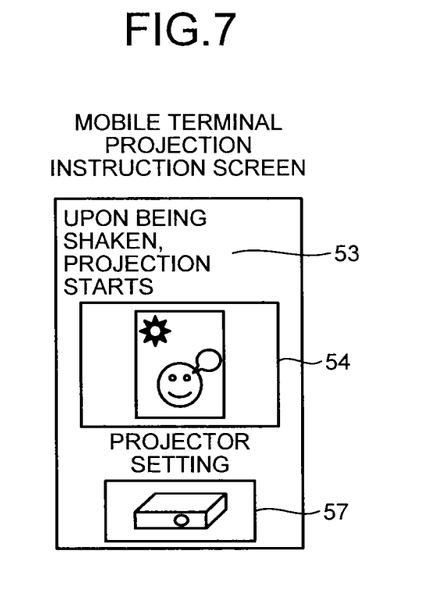
FIG. 7 is a schematic diagram illustrating an example of a screen for giving an instruction of projection to a projector in a mobile terminal according to a second embodiment.
Figure 8:
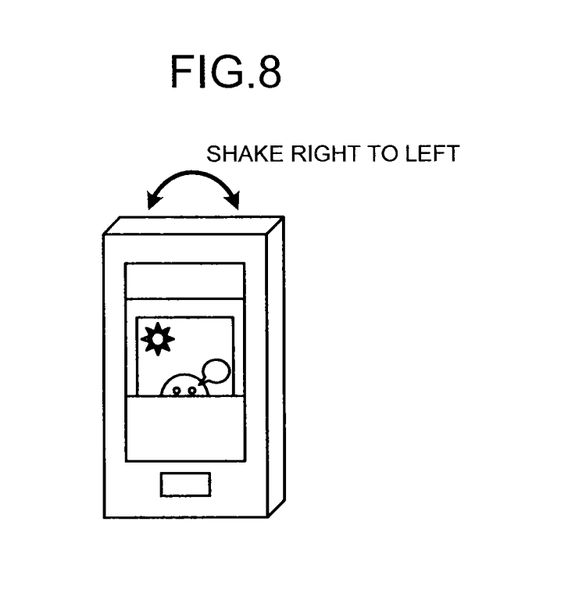
FIG. 8 is a schematic diagram illustrating an exemplary operation method of the mobile terminal in the second embodiment.
Figure 9:
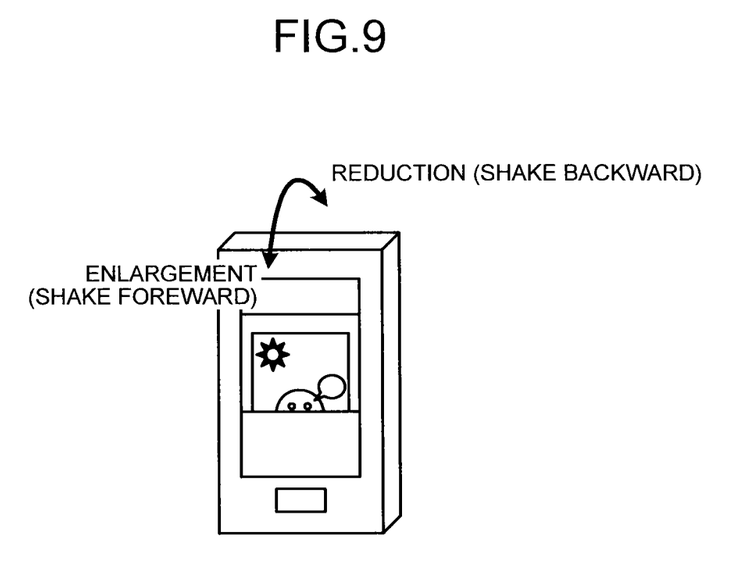
FIG. 9 is a schematic diagram illustrating another exemplary operation method of the mobile terminal in the second embodiment.
Figure 10:
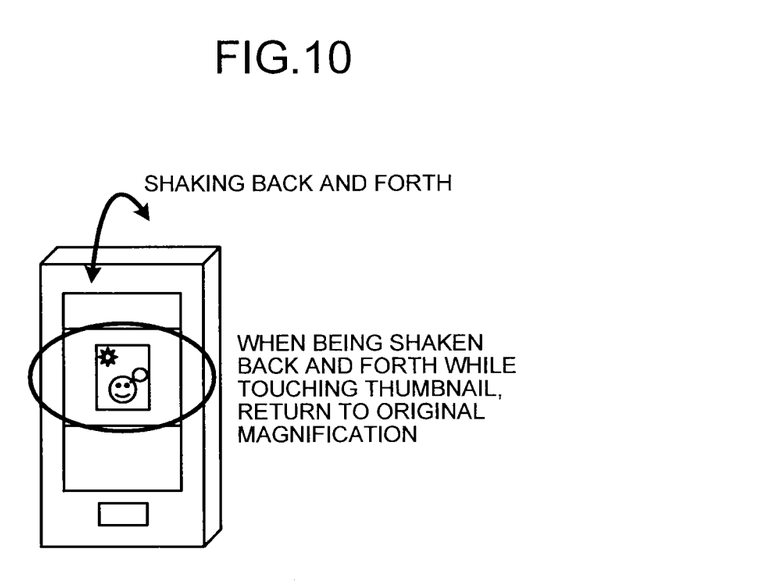
FIG. 10 is a schematic diagram illustrating still another exemplary operation method of the mobile terminal in the second embodiment.

In FIG. 7, a projector setting section 57 is provided instead of the printer setting section. In the mobile terminal 10, an instruction of output to a selected projector is given when the motion of "shaking right to left" the mobile terminal 10, as illustrated in FIG. 8, is detected. In addition, when the mobile terminal 10 is "shaken forward", an instruction of enlarging data output to the projector is given, while when the mobile terminal 10 is "shaken backward", an instruction of reducing data output to the projector is given. Furthermore, when the motion of "shaking back and forth" the mobile terminal 10 while a touch is made on the thumbnail display area 54, as illustrated in FIG. 10, is detected; the enlargement or the reduction is cancelled and the data returns to the initial size.

In this way, the intuitive operation can be performed by allocating processing of changing an output manner of data to the motion such as the "shaking" motion or the "tilting" motion in association with the output apparatus.

The output controller 18 may be achieved by either software or hardware.

Various types of processing executed by the output controller of the above-described embodiments are provided by being preliminarily stored in the ROM, for example.

Various types of processing executed by the output controller of the embodiments may be recorded into a storage medium readable by a computer in a format installable in or a file executable by the computer, and may be provided. The examples of the storage medium include a compact disk ROM (CD-ROM), a flexible disk (FD), a CD-recordable (CD-R), and a digital versatile disk (DVD).

In addition, various types of processing executed by the output controllers of the embodiments may be stored in a computer coupled with a network such as the Internet, and may be provided by being downloaded through the network. Various types of processing executed by the output controllers of the embodiments may be provided or delivered through a network such as the Internet.

In the embodiments, the image forming apparatus is applied to a multifunction peripheral having at least two functions out of copying, printing, scanning, and facsimile functions. Any of the image forming apparatuses such as a copying machine, a printer, a scanner, and a facsimile is applicable with the image forming apparatus of the embodiment.

The embodiment provides an advantage of intuitively giving the instruction of outputting data without visual confirmation of the operation display screen of the mobile terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal, comprising:
   an operation display unit that displays information and receives operation input;
   an operation detection unit that detects operation of the operation display unit;
   a motion detection unit that detects a motion of the mobile terminal;
   a data selection unit that selects data to be output;
   an output destination determining unit that determines an external apparatus serving as an output destination of the selected data; and
   an output instruction unit that gives an instruction of outputting the data to the external apparatus when the motion is detected by the motion detection unit.

2. The mobile terminal according to claim 1, wherein the output destination determining unit acquires a list of external apparatuses capable of connecting to the mobile terminal and determines the external apparatus a user selects from the list as the external apparatus serving as an output destination.

3. The mobile terminal according to claim 1, wherein
   the external apparatus is an image forming apparatus, and
   the output instruction unit transmits a print instruction to the image forming apparatus.

4. The mobile terminal according to claim 3, further comprising a measurement unit that starts measuring time when the motion is detected by the motion detection unit in a state where the data is selected and the external apparatus serving as the output destination is determined, wherein
   the output instruction unit transmits the print instruction of printing the data a number of prints that is equal to a number of times the motion is detected by the motion detection unit until the time measured by the measurement unit exceeds a certain period of time.

5. The mobile terminal according to claim 3, further comprising a measurement unit that starts measuring time when the motion is detected by the motion detection unit in a state where the data is selected and the external apparatus serving as the output destination is determined, wherein
   the output instruction unit increments a number of prints every detection of the motion and resets the measured time, and transmits the print instruction of printing the data the incremented number of prints when the time measured by the measurement unit exceeds a certain period of time.

6. The mobile terminal according to claim 3, further comprising a display area selection unit that selects partial data to be displayed on the operation display unit out of the selected data, wherein
   the output instruction unit
      gives an instruction of printing only the partial data of the data when a touch made on the operation display unit is detected by the operation detection unit and the motion is detected by the motion detection unit, and
      gives an instruction of printing whole data when no touch on the operation display unit is detected by the operation detection unit and the motion is detected by the motion detection unit.

7. The mobile terminal according to claim 1, further comprising a notification unit that causes the operation display unit to display a notification promoting a user to select the data or to determine the external apparatus when the motion is detected by the motion detection unit, but the data is not selected by the data selection unit or the external apparatus is not determined by the output destination determining unit.

8. An output control system, comprising:
   a mobile terminal; and
   an external apparatus, wherein
   the mobile terminal includes:
      an operation display unit that displays information and receives operation input;
      an operation detection unit that detects operation of the operation display unit;
      a motion detection unit that detects a motion of the mobile terminal;
      a data selection unit that selects data to be output;
      an output destination determining unit that determines an external apparatus serving as an output destination of the selected data; and
      an output instruction unit that gives an instruction of outputting the data to the external apparatus when the motion is detected by the motion detection unit; and
   the external apparatus includes:
      an output unit that outputs instructed data.

9. A data outputting method for a mobile terminal, comprising:
   displaying information and receiving operation input by an operation display unit;
   detecting operation of the operation display unit by an operation detection unit;
   detecting a motion of the mobile terminal by a motion detection unit;
   selecting data to be output by a data selection unit;
   determining an external apparatus serving as an output destination of the selected data by an output destination determining unit; and
   giving an instruction of outputting the data to the external apparatus when the motion is detected by the motion detection unit by an output instruction unit.

10. The data outputting method according to claim 9, wherein
   acquiring, by the output destination determining unit, a list of external apparatuses capable of connecting to the mobile terminal and
   determining the external apparatus a user selects from the list as the external apparatus serving as an output destination.

11. The data outputting method according to claim 9, wherein
   the external apparatus is an image forming apparatus, and
   the output instruction unit transmits a print instruction to the image forming apparatus.

12. The data outputting method according to claim 11, further comprising starting, by a measurement unit, measuring time when the motion is detected by the motion detection unit in a state where the data is selected and the external apparatus serving as the output destination is determined, wherein
   the output instruction unit transmits the print instruction of printing the data a number of prints that is equal to a number of times the motion is detected by the motion detection unit until the time measured by the measurement unit exceeds a certain period of time.

13. The data outputting method according to claim 11, further comprising starting, by a measurement unit, measuring time when the motion is detected by the motion detection unit in a state where the data is selected and the external apparatus serving as the output destination is determined, wherein
   the output instruction unit increments a number of prints every detection of the motion and resets the measured time, and transmits the print instruction of printing the data the incremented number of prints when the time measured by the measurement unit exceeds a certain period of time.

14. The data outputting method according to claim 11, further comprising
   selecting, by a display area selection unit, partial data to be displayed on the operation display unit out of the selected data, wherein
   the output instruction unit
      gives an instruction of printing only the partial data of the data when a touch made on the operation display unit is detected by the operation detection unit and the motion is detected by the motion detection unit, and
      gives an instruction of printing whole data when no touch on the operation display unit is detected by the operation detection unit and the motion is detected by the motion detection unit.

15. The data outputting method according to claim 9, further comprising
   causing, by a notification unit, the operation display unit to display a notification promoting a user to select the data or to determine the external apparatus when the motion is detected by the motion detection unit, but the data is not selected by the data selection unit or the external apparatus is not determined by the output destination determining unit.

* * * * *